United States Patent [19]

Rehfuss et al.

[11] Patent Number: 5,512,639

[45] Date of Patent: Apr. 30, 1996

[54] CURABLE COMPOSITIONS CONTAINING CARBAMATE-MODIFIED POLYISOCYANATES

[75] Inventors: John W. Rehfuss, West Bloomfield; Walter H. Ohrbom, Southfield, both of Mich.

[73] Assignee: BASF Corporation, Southfield, Mich.

[21] Appl. No.: 98,176

[22] Filed: Jul. 28, 1993

[51] Int. Cl.$^6$ ................................................. C08F 283/04
[52] U.S. Cl. .................... 525/456; 525/452; 525/453; 525/459; 525/509
[58] Field of Search .................... 525/440, 452, 525/453, 456, 459, 509

[56] References Cited

U.S. PATENT DOCUMENTS

| | | | |
|---|---|---|---|
| 3,479,328 | 11/1969 | Nordstrom | 260/86.1 |
| 3,674,838 | 7/1972 | Nordstrom | 260/482 C |
| 4,100,143 | 7/1978 | Wolf et al. | 526/301 |
| 4,126,747 | 11/1978 | Cowherd, III et al. | 520/166 |
| 4,239,866 | 12/1980 | Reitel et al. | 525/440 |
| 4,279,833 | 7/1981 | Culbertson et al. | 260/464 |
| 4,340,497 | 7/1982 | Knopf | 252/188.3 |
| 4,543,276 | 9/1985 | Parekh | 427/388.3 |
| 4,581,430 | 4/1986 | Phan et al. | |
| 4,758,632 | 7/1988 | Parekh et al. | |
| 4,820,830 | 4/1989 | Blank | 560/188 |
| 4,942,215 | 7/1990 | Greco et al. | 528/114 |
| 5,134,205 | 7/1992 | Blank | 525/509 |

FOREIGN PATENT DOCUMENTS

| | | | |
|---|---|---|---|
| 912563 | 12/1962 | United Kingdom | 544/221 |
| 974900 | 11/1964 | United Kingdom | 544/221 |
| WO94/10213 | 10/1993 | WIPO | C08F 8/30 |
| WO94/10212 | 10/1993 | WIPO | C08F 8/30 |
| WO94/10211 | 10/1993 | WIPO | C08F 8/30 |

OTHER PUBLICATIONS

John W. Rehfuss; Tri–Combamate–Functional Crosslinking Agents; Apr. 30, 1993 pp. 1–17; 08/056,514.

John W. Rehfuss, "Composite Color–Plus–Clear Coating Utilizing Carbamate–Functional Polymer Composition in the Clearcoat", Oct. 23, 1992 (07/965,577).

John W. Rehfuss, "Curable Carbamate–Functional Polymer Composition", Oct. 23, 1992, (07/965,509).

*Primary Examiner*—James J. Seidleck
*Assistant Examiner*—Mary Critharis
*Attorney, Agent, or Firm*—Paul L. Marshall

[57] ABSTRACT

Curable compositions are disclosed comprising:

(A) carbamate-functional compound that is the reaction product of a mixture comprising:
  (1) a monomeric polyisocyanate, and
  (2) a compound comprising a group that is reactive with isocyanate and a carbamate group or group that can be converted to carbamate, and (B) a compound having a plurality of functional groups that are reactive with carbamate groups on said carbamate-functional compound.

9 Claims, No Drawings

5,512,639

CURABLE COMPOSITIONS CONTAINING CARBAMATE-MODIFIED POLYISOCYANATES

FIELD OF THE INVENTION

This invention relates to curable compositions, especially coating compositions.

BACKGROUND OF THE INVENTION

Curable compositions based on polyisocyanates for coating and/or molding are well-known in the art. They provide a number of desirable characteristics such as resistance to solvent, salt, and other types of environmental attack.

However, these compositions suffer some disadvantages. Polyisocyanates can be highly difficult to handle. The NCO groups on the polyisocyanate are highly reactive, so they must be chemically blocked if it is desired to use the polyisocyanate in a one-pack curable composition. The use of chemical blocking groups further increases the expense of the material, results in increased VOC during cure, introduces an additional component into the composition that can have the potential for adverse side-effects such as yellowing, and necessitates a high heat curing temperature on the order of 150° C. If the NCO groups are not chemically blocked, the polyisocyanate must be utilized as one part of a two-pack curable composition. With such a composition, the highly-reactive polyisocyanate must be kept isolated from the surrounding environment and from the other component(s) of the composition until just before application to a substrate or mold, further increasing the expense and complexity of the process.

It has thus long been desired to produce a composition that exhibits the advantages of polyisocyanate-based curable compositions having an optimum mix of characteristics as described above, but without having to use NCO groups as the functional groups for the curing reaction.

SUMMARY OF THE INVENTION

According to the present invention, there is provided a curable composition comprising:

(A) carbamate-functional compound that is the reaction product of a mixture comprising:
  (1) a monomeric polyisocyanate, and
  (2) a compound comprising a group that is reactive with isocyanate and a carbamate group or group that can be converted to carbamate, and (B) a compound having a plurality of functional groups that are reactive with carbamate groups on said carbamate-functional compound.

These curable compositions may be used for a variety of applications, such as coatings, castings, and moldings. When used for coatings, for example, they provide durable hard coatings exhibiting many of the above desirable characteristics for exterior coatings, especially automotive clearcoats.

DESCRIPTION OF THE PREFERRED EMBODIMENTS

The monomeric polyisocyanate can be an aliphatic polyisocyanate, including a cycloaliphatic polyisocyanate or an aromatic polyisocyanate. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, 1,4-methylene bis-(cyclohexyl isocyanate) and isophorone diisocyanate. Useful aromatic diisocyanates and araliphatic diisocyanates include the various isomers of toluene diisocyanate, meta-xylylenediioscyanate and para-xylylenediisocyanate, also 4-chloro-1,3-phenylene diisocyanate, 1,5-tetrahydro-naphthalene diisocyanate, 4,4'-dibenzyl diisocyanate and 1,2,4-benzene triisocyanate can be used. In addition, the various isomers of $\alpha,\alpha,\alpha',\alpha'$-tetramethyl xylylene diisocyanate can be used. Biurets of isocyanates such as DESMODUR® N100 from Mobay may also be useful.

In one embodiment of the invention, the monomeric polyisocyanate (A)(1) is reacted with a compound containing an isocyanate-reactive group and a carbamate group, e.g., a hydroxyalkyl carbamate such as hydroxypropyl carbamate or hydroxyethyl carbamate. Alternatively, the polyisocyanate may be adducted with substituents that have the capability of forming carbamate groups after reaction with the polyisocyanate compound is completed. For example, the polyisocyanate can be reacted with a compound having an active hydrogen group (e.g., hydroxyl) and a cyclic carbonate group (e.g., the reaction product of glycidol and $CO_2$), and the cyclic carbonate groups then reacted with ammonia to form the carbamate functional groups. Alternatively, the polyisocyanate can be reacted with an active hydrogen group (e.g., hydroxyl) and an epoxy group, and then with $CO_2$ to convert the epoxy to cyclic carbonate, and the cyclic carbonate groups then reacted with ammonia to form the carbamate functional groups.

Another method of synthesis is to first react the isocyanate groups on the polyisocyanate with a compound having a group that is reactive with isocyanate and also a non-NCO functional group. This adduct is then reacted with a compound comprising at least one carbamate group or group that can be converted to carbamate and at least one group reactive with the non-NCO functional groups. Examples of non-NCO functional groups include carboxyl, epoxy, hydroxyl, amino. For example, an OH-functional polyisocyanate (which can be formed by reacting a polyisocyanate with an amino alcohol) can be reacted with the oxygen of a COO portion of the carbamate group on an alkyl carbamate or with the methylol group of methylol acrylamide (HO—$CH_2$—NH—CO—CH=$CH_2$). In the case of the COO group on an alkyl carbamate, the hydroxyl group on the polyurethane undergoes a transesterification with the COO group, resulting in the carbamate group being appended to the polyurethane. In the case of methylol acrylamide, the unsaturated double bond is then reacted with peroxide, $CO_2$, and ammonia as described above. The epoxy groups are then reacted with $CO_2$ to form cyclic carbonate groups, which are converted to carbamate groups by reaction with ammonia. Alternatively, an acid-functional polyisocyanate (which can be formed by reaction of a polyisocyanate with a hydroxy-functional carboxylic acid) can be reacted with acetic anhydride to generate an anhydride-functional triisocyanurate, which can then be reacted with an hydroxycarbamate.

The above-described monomeric polyisocyanates are adducted with compounds containing a carbamate group or group that can be converted to carbamate and a group that is reactive with the NCO- or non-NCO-functional group on the polyisocyanate. Carbamate-containing compounds that can be adducted onto the NCO groups of a diisocyanate or an isocyanurate are preferably active hydrogen-containing carbamates such as hydroxyalkyl carbamates (e.g., hydroxypropyl carbamate or hydroxyethyl carbamate). Compounds containing groups that can be converted to carbamate and groups that are reactive with NCO include active hydrogen-containing cyclic carbonate compounds convertible to carbamate by reaction with ammonia (e.g., the reaction product of glycidol and $CO_2$), monoglycidyl ethers (e.g., Cardura E®) convertible to carbamate by reaction with $CO_2$ and then ammonia, and monoglycidyl esters (e.g., the reaction product of a carboxylic acid and epichlorohydrin) convertible to carbamate by reaction with $CO_2$ and then ammonia, allyl alcohols where the alcohol group is reactive with NCO and the double bond can be converted to carbamate by reaction with peroxide, and vinyl esters where the ester group is reactive with NCO and the vinyl group can be converted to carbamate by reaction with peroxide, then $CO_2$, and then ammonia.

The composition of the invention is cured by a reaction of the carbamate-modified polyisocyanate (A) with a compound (B) that is a compound having a plurality of functional groups that are reactive with the carbamate groups on (A). Such reactive groups include active methylol or methylalkoxy groups on aminoplast crosslinking agents or on other compounds such as phenol/formaldehyde adducts, acrylamide groups, isocyanate groups, siloxane groups, cyclic carbonate groups, and anhydride groups. Examples of (B) compounds include melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), polymers having acrylamide groups, polymers having methylol or alkoxymethyl groups, polyanhydrides (e.g., polysuccinic anhydride), and polysiloxanes (e.g., trimethoxy siloxane). Aminoplast resin such as melamine formaldehyde resin or urea formaldehyde resin are especially preferred. Even more preferred are aminoplast resins where one or more of the amino nitrogens is substituted with a carbamate group for use in a process with a curing temperature below 150° C., as described in U.S. patent application Ser. No. 07/965,510 entitled "Carbamate-Defunctionalized Aminoplast Curing for Polymer Compositions" in the names of John W. Rehfuss and Donald L. St. Aubin.

A solvent may optionally be utilized in the curable composition used in the practice of the present invention. Although the composition used according to the present invention may be utilized, for example, in the form of substantially solid powder, or a dispersion, it is often desirable that the composition is in a substantially liquid state, which can be accomplished with the use of a solvent. This solvent should act as a solvent with respect to both the urea-functional component (A) as well as the component (B). In general, depending on the solubility characteristics of components (A) and (B), the solvent can be any organic solvent and/or water. In one preferred embodiment, the solvent is a polar organic solvent. More preferably, the solvent is a polar aliphatic solvents or polar aromatic solvents. Still more preferably, the solvent is a ketone, ester, acetate, aprotic amide, aprotic sulfoxide, or aprotic amine. Examples of useful solvents include methyl ethyl ketone, methyl isobutyl ketone, m-amyl acetate, ethylene glycol butyl ether-acetate, propylene glycol monomethyl ether acetate, xylene, N-methylpyrrolidone, or blends of aromatic hydrocarbons. In another preferred embodiment, the solvent is water or a mixture of water with small amounts of aqueous co-solvents.

The curable composition used in the practice of the invention may include a catalyst to enhance the cure reaction. For example, when aminoplast compounds, especially monomeric melamines, are used as component (b), a strong acid catalyst may be utilized to enhance the cure reaction. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Other catalysts that may be useful in the composition of the invention include Lewis acids, zinc salts, and tin salts.

In a preferred embodiment of the invention, the composition of the invention is utilized as a coating composition. In such a composition, the solvent may be present in the composition of the invention in an amount of from about 0.01 weight percent to about 99 weight percent, preferably from about 10 weight percent to about 60 weight percent, and more preferably from about 30 weight percent to about 50 weight percent.

Coating compositions can be coated on the article by any of a number of techniques well-known in the art. These include, for example, spray coating, dip coating, roll coating, curtain coating, and the like. For automotive body panels, spray coating is preferred.

The coating composition according to the present invention may be clear, or it may include a pigment as is well-known in the art. In a preferred embodiment, the coating composition is the clearcoat of a color-plus-clear composite coating.

Pigmented basecoat compositions for such composite coatings are well-known in the art, and do not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers are preferably crosslinkable, and thus comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

The composition of the invention is generally heat-cured by exposing it to elevated temperatures. Curing temperatures will vary depending on the particular blocking groups used in the cross-linking agents, however they generally range between 93° C. and 177° C., and are preferably between 121° C. and 141° C. The curing time will vary depending on the particular components used, and physical parameters such as the thickness of the layers (in the case of a coating). Typical curing times for coatings range from 15 to 60 minutes.

The invention is further described in the following examples.

PREPARATION 1

A reactor was charged with 363 parts propylene glycol monomethyl ether acetate and 25.9 parts of toluene, and heated under inert atmosphere to reflux (140° to 143° C.). Once at reflux, the inert atmosphere was turned off and 26.6 parts of the refluxed reaction mixture was removed. The mixture was then cooled to 80° C. and 707 parts of T-1890® (the isocyanurate of isophorone diisocyanate, available from Hüls), 198.4 parts of isophorone diisocyanate, and 4.3 parts of dibutyltin dilaurate was charged. 458.9 parts of hydroxypropyl carbamate was then added over two hours and 35 minutes. 110.7 parts of of propylene glycol monomethyl ether acetate was then charged. The system was kept at 80° C. until the reaction mixture was free of isocyanate. 323.7 parts of xylene and 96.7 parts of n-butanol were then added. The resulting product had a solids content of 53.9%, and a theoretical non-volatile carbamate equivalent weight of 300 g/eq.

13.1 g of this product was combined with 3.3 g of a melamine formaldehyde resin having 50% of the functional groups blocked with butyl carbamate, and 0.06 g dodecyl benzene sulfonic acid to form an 84.5% nonvolatiles composition. The system was reduced to 50% nonvolatiles with propylene glycol monomethyl ether acetate, and drawn down 8 mm on a glass substrate. The composition was then cured at 141° C. for 30 minutes to form a hard, clear, smooth colorless film that passed 200 methyl ethyl ketone double rubs.

EXAMPLE 2

A reactor was charged with 360.7 parts propylene glycol monomethyl ether acetate and 25 parts of toluene, and heated under inert atmosphere to reflux (140° to 143° C.). Once at reflux, the inert atmosphere was turned off and 24 parts of the refluxed reaction mixture was removed. The mixture was then cooled to 78° C. and 539.5 parts of the isocyanurate of methylene bis(4-cyclohexylisocyanate), 215.8 parts of methylene bis(4-cyclohexylisocyanate), 4.3 parts of dibutyltin dilaurate and 323.7 parts of xylene was charged. 399.9 parts of hydroxypropyl carbamate was then added over 1 hour and 20 minutes. 100.8 parts of propylene glycol monomethyl ether acetate was then charged, and the reaction mixture was kept at 75° to 80° C. until free of isocyanate. 106.1 parts of Solvesso® S-100 mixed aromatic solvent, 106.0 parts of butyl acetate, and 160.3 parts of n-butanol were charged. The resulting product had a solids content of 51.1%, and a theoretical non-volatile carbamate equilalent weight of 345.3 g/eq.

The invention has been described in detail with reference to preferred embodiments thereof. It should be understood, however, that variations and modifications can be made within the spirit and scope of the invention.

What is claimed is:

1. A curable coating composition comprising:
   (A) a monomeric carbamate-functional compound that is the reaction product of a mixture comprising:
      (1) a monomeric polyisocyanate, and
      (2) a compound having a group that is reactive with said monomeric polyisocyanate and a carbamate group or group that can be converted to carbamate, and
   (B) a compound having a plurality of functional groups that are reactive with carbamate groups on said carbamate-functional compound.

2. A curable coating composition according to claim 1 wherein the compound (A)(2) is a carbamate compound having an active hydrogen group.

3. A curable coating composition according to claim 2 wherein the compound (A)(2) is a hydroxyalkyl carbamate.

4. A curable coating composition according to claim 1 wherein the compound (A)(2) is a hydroxyalkyl cyclic carbonate.

5. A curable coating composition according to claim 1 wherein the compound B is an aminoplast.

6. A curable coating composition according to claim 5 wherein the aminoplast is a melamine formaldehyde resin.

7. A curable coating composition according to claim 5 wherein the aminoplast is a urea formaldehyde resin.

8. A color-plus-clear composite coating wherein the clear coating is derived from a curable composition according to any of claims 1–4 or 5–7.

9. A curable composition comprising:
   (A) a monomeric carbamate-functional compound that is the reaction product of a mixture comprising:
      (1) a monomeric polyisocyanate, and
      (2) a compound having a group that is reactive with said monomeric polyisocyanate and a carbamate group or group that can be converted to carbamate, and
   (B) a compound having a plurality of functional groups that are reactive with carbamate groups on said carbamate-functional compound.

* * * * *